(12) United States Patent
Zhao

(10) Patent No.: US 8,837,262 B2
(45) Date of Patent: Sep. 16, 2014

(54) VOICE CONTROL OF OPTICAL DISK DRIVE

(71) Applicants: Hong Fu Jin Precision Industry (WuHan) Co., Ltd., Wuhan (CN); Hon Hai Precision Industry Co., Ltd., New Taipei (TW)

(72) Inventor: Long Zhao, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/870,943

(22) Filed: Apr. 25, 2013

(65) Prior Publication Data

US 2013/0294209 A1    Nov. 7, 2013

(30) Foreign Application Priority Data

May 4, 2012    (CN) .......................... 2012 1 0135777

(51) Int. Cl.
*G11B 31/00* (2006.01)
*H04B 1/20* (2006.01)
*G11B 20/00* (2006.01)
*G11B 19/02* (2006.01)
*G11B 17/056* (2006.01)

(52) U.S. Cl.
CPC ................ *G11B 20/00* (2013.01); *G11B 19/02* (2013.01); *G11B 17/056* (2013.01)
USPC ................................................ 369/22; 369/8

(58) Field of Classification Search
CPC ........ G11B 20/00; G11B 31/00; G10L 19/10; H04B 1/20
USPC ............... 369/22, 19, 8, 5, 2; 348/222.1, 273, 348/280, 281; 704/230
See application file for complete search history.

(56) References Cited

U.S. PATENT DOCUMENTS 7,595,819 B2 *    9/2009    Kondo ........................ 348/222.1

* cited by examiner

*Primary Examiner* — Ali Neyzari
(74) *Attorney, Agent, or Firm* — Novak Druce Connolly Bove + Quigg LLP

(57) ABSTRACT

A control circuit for an optical disk drive includes a microphone, an analog-to-digital (A/D conversion) module, a control module, and a processing module configured to compare a digital representation of a spoken command from a user against the operation representation of the control module. If the processing module determines that a spoken command in the analog form, is equal to the digital signal, the control module acts on the command and controls the optical disk drive to change its status.

10 Claims, 4 Drawing Sheets

VOICE CONTROL OF OPTICAL DISK DRIVE

BACKGROUND

1. Technical Field

The present disclosure relates to a control circuit for an optical disk drive.

2. Description of Related Art

An optical disk drive of a computer can play a compact disc (CD) or a digital video disk (DVD). Generally, a tray of the optical disk drive is opened or closed manually, using a very small button, which is inconvenient for a user.

Therefore, there is room for improvement in the art.

BRIEF DESCRIPTION OF THE DRAWINGS

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

DETAILED DESCRIPTION

Figure 1:
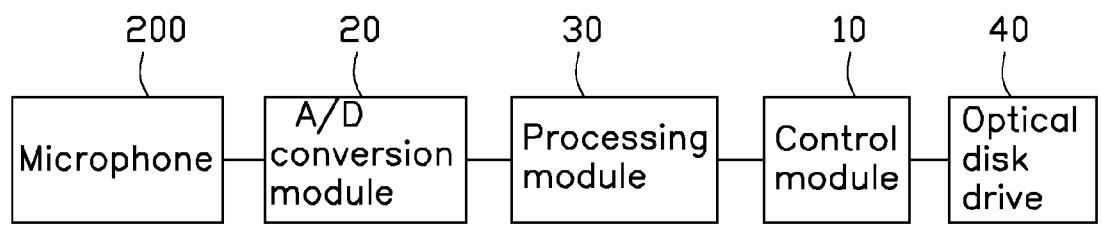
FIG. 1 is a block diagram of an embodiment of a control circuit for an optical disk drive of the present disclosure, wherein the control circuit includes an analog-to-digital (A/D) conversion module, a processing module, and a control module.

FIG. 1 shows an embodiment of a control circuit for an optical disk drive 40 installed in a computer. The control circuit includes a microphone 200 configured to generate analog electronic signals corresponding to a user's voice, an analog-to-digital (A/D) conversion module 20 configured to convert the analog signals into a digital signal, a processing module 30 configured to identify the digital signal and output a processing signal, and a control module 10 configured to control the status of the optical disk drive 40 according to the processing signal.

Figure 2:
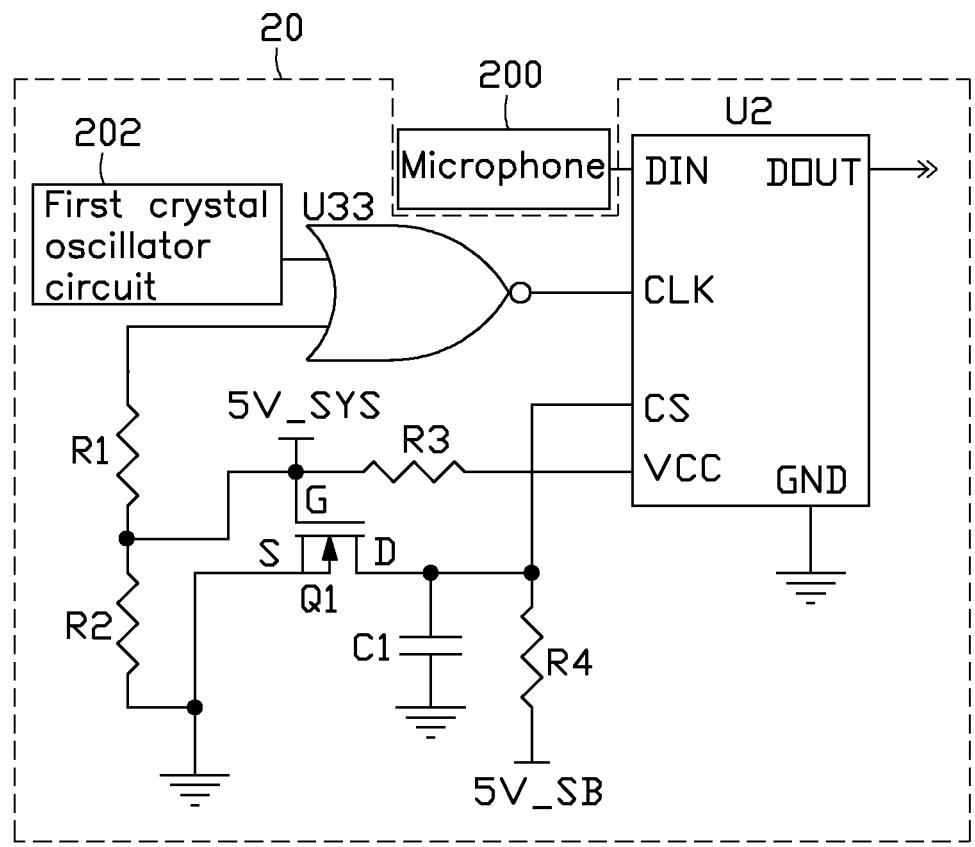
FIG. 2 is a circuit diagram of the A/D conversion module of FIG. 1.

Referring to FIG. 2, the A/D conversion module 20 includes an A/D conversion chip U2, a first crystal oscillator circuit 202, a NOR gate U33, an electronic switch Q1, a capacitor C1, and four resistors R1-R4.

An input pin DIN of the A/D conversion chip U2 is coupled to the microphone 200, to receive the analog signals corresponding to the user's voice. An output pin DOUT of the A/D conversion chip U2 outputs the digital signal converted from the analog signals. A chip select pin CS of the A/D conversion chip U2 is coupled to a power terminal 5V_SB through the resistor R4. When the chip select pin CS is at a high level, such as logic 1, the A/D conversion chip U2 stops operating, and when the chip select pin CS is at a low level, such as logic 0, the A/D conversion chip U2 continues to operate normally. A power pin VCC of the A/D conversion chip U2 is coupled to a power terminal 5V_SYS through the resistor R3. A ground pin of the A/D conversion chip U2 is connected to ground.

A first input pin of the NOR gate U33 is coupled to the first crystal oscillator circuit 202, and a second input pin of the NOR gate U33 is grounded through the resistors R1 and R2 in that order. A clock signal pin CLK of the A/D conversion chip U2 is coupled to an output pin of the NOR gate U33. A node between the first and second resistors R1 and R2 is coupled to the power terminal 5V_SYS. In this embodiment, the first input pin of the NOR gate U33 receives a clock signal with a sine wave generated by the first crystal oscillator circuit 202, and the second input pin of the NOR gate U33 receives a voltage from the power terminal 5V_SYS, thereby enabling the output pin of the NOR gate U33 to output a clock signal with a square wave.

A first terminal of the electronic switch Q1 is coupled to the power terminal 5V_SYS. A second terminal of the electronic switch Q1 is grounded through the capacitor C1, and coupled to the chip select pin CS of the A/D conversion chip U2. A third terminal of the electronic switch Q1 is grounded. The electronic switch Q1 is turned off when the first terminal is at a low level, and the electronic switch Q1 is turned on when the first terminal is at a high level. In this embodiment, the electronic switch Q1 is an n-channel metal oxide semiconductor transistor (NMOS), where a gate, a drain, and a source of the NMOS are the first, second, and third terminals of the electronic switch Q1, respectively. In other embodiments, the electronic switch may be an npn transistor, where a base, a collector, and an emitter of the npn transistor are the first, second, and third terminals of the electronic switch Q1, respectively.

Figure 3:
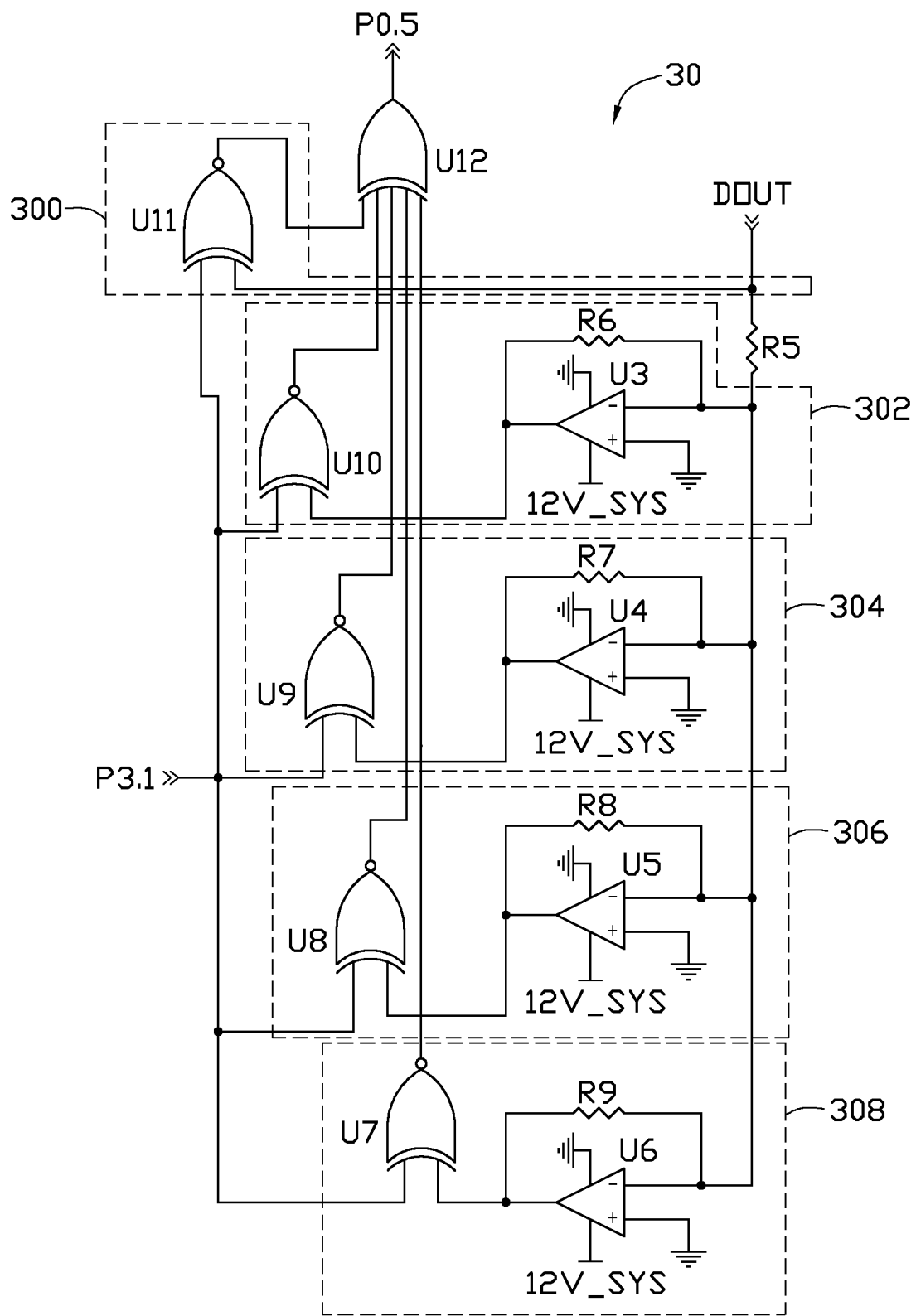
FIG. 3 is a circuit diagram of the processing module of FIG. 1.
Figure 4:
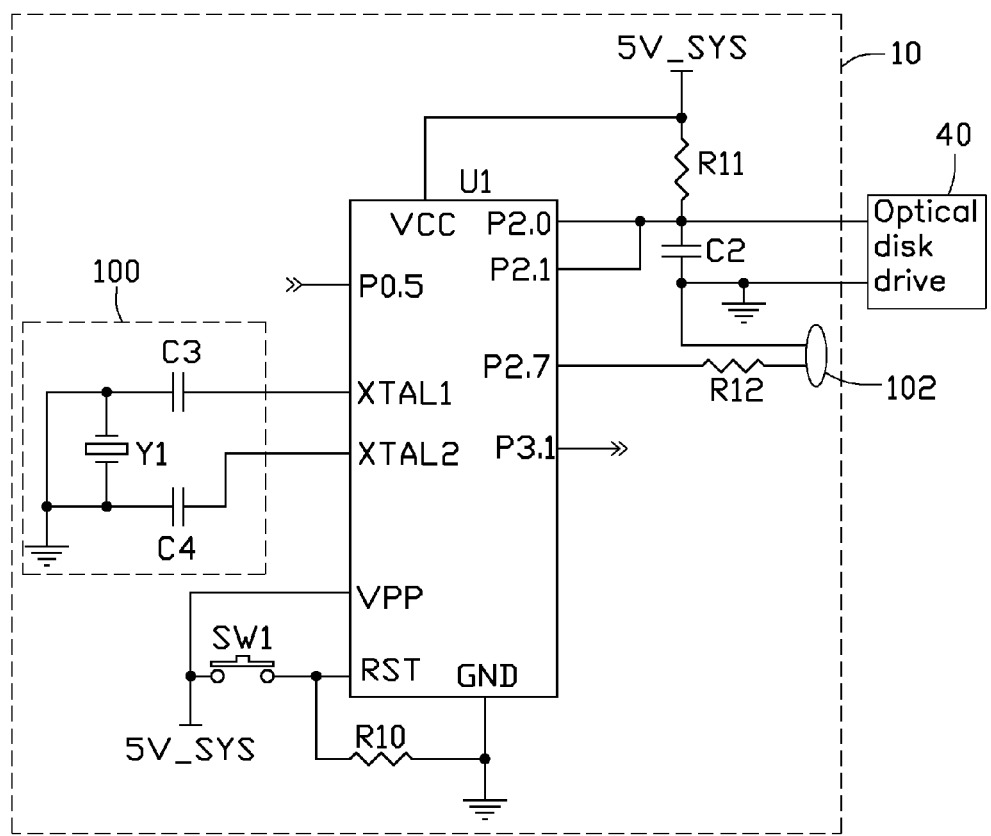
FIG. 4 is a circuit diagram of the control module of FIG. 1.

Referring to FIGS. 3 and 4, the processing module 30 includes a plurality of sub-circuits, a resistor R5, and an OR gate U12. Each sub-circuit is configured to boost or reduce the digital signal from the A/D conversion module 20, to a certain level, and for a predetermined number of times. In this embodiment, the processing module 30 includes first to fifth sub-circuits 300, 302, 304, 306, and 308, which are configured to boost once, 1.5 times, and 2 times, and to reduce 0.5 times, and 0.67 times, respectively.

The first sub-circuit 300 includes an XNOR gate U11. A first input terminal of the XNOR gate U11 is coupled to the output pin DOUT of the A/D conversion chip U2, to receive the digital signal of the A/D conversion chip U2. A second input terminal of the XNOR gate U11 is coupled to the control module 10, to receive an operation signal from the control module 10. An output terminal of the XNOR gate U11 is coupled to one of the input terminals of the OR gate U12. When the voltages of the first and second input terminals of the XNOR gate U11 are equal to each other, the output terminal of the XNOR gate U11 outputs a high level voltage as a result of the comparison. When the voltages of the first and second input terminals of the XNOR gate U11 are not equal to each other, the output terminal of the XNOR gate U11 outputs a low level voltage as a result of the comparison.

The second sub-circuit 302 includes an XNOR gate U10, a resistor R6, and an amplifier U3. The third sub-circuit 304 includes an XNOR gate U9, a resistor R7, and an amplifier U4. The fourth sub-circuit 306 includes an XNOR gate U8, a resistor R8, and an amplifier U5. The fifth sub-circuit 308 includes an XNOR gate U7, a resistor R9, and an amplifier U6. An inverting input terminal of each of the amplifiers U3-U6 is coupled to the output pin DOUT of the A/D conversion chip U2 through the resistor R5. The inverting input terminals of the amplifiers U3-U6 are coupled to output terminals of the amplifiers U3-U6 through the resistors R6-R9, respectively. A non-inverting input terminal of each of the amplifiers U3-U6 is grounded. A ground terminal of each of the amplifiers U3-U6 is grounded. A power terminal of each of the amplifiers U3-U6 is coupled to a power terminal 12V_SYS. The output terminal of each of the amplifiers U3-U6 is coupled to a first input terminal of the XNOR gate in the same sub-circuit. A second input terminal of the XNOR gate of each sub-circuit is configured to receive the operation signal from the control module 10. An output terminal of each XNOR gate outputs a comparison signal to the input terminals of the OR gate U12. In this embodiment, the resistance of the resistor R5 is 1 kilohm (KΩ), and the resistance of the resistor R6 is 1.51KΩ. Hence, the second sub-circuit 302 is configured to boost the digital signal outputted by the output pin DOUT of the A/D conversion chip U2 by a multiplication factor of 1.5. The resistance of the resistor R7 in the third sub-circuit 304 is 2KΩ, and the third sub-circuit 304 is configured to reduce the digital signal by a multiplication factor of 2. The resistance of the resistor R8 in the fourth sub-circuit 306 is 0.5KΩ, and the fourth sub-circuit 306 is configured to reduce the digital signal by a multiplication factor of 0.5. The resistance of the resistor R9 in the fifth sub-circuit 308 is 0.67KΩ, and the fifth sub-circuit 308 is configured to reduce the digital signal by a multiplication factor of 0.67. The processing module 30 outputs a high level processing signal through an output terminal of the OR gate U12, in response to there being at least one sub-circuit containing a comparison signal (outputted by the output terminal of the XNOR gate) which is equal to the operation signal from the control module 10. Otherwise, the processing module 30 outputs a low level processing signal through the output terminal of the OR gate U12.

The control module 10 includes a processor U1, a second crystal oscillator circuit 100, a switch SW1, a buzzer 102, a capacitor C2, and three resistors R10-R12. The control module 10 outputs the operation signal to the processing module 30, and controls the status of the optical disk drive 40 according to the processing signal outputted from the processing module 30.

The second crystal oscillator circuit 100 includes a crystal oscillator Y1 and two capacitors C3 and C4. First and second terminals of the crystal oscillator Y1 are grounded, and are coupled to crystal pins XTAL1 and XTAL2 of the processor U1 through the capacitors C3 and C4, respectively.

Power pins VPP and VCC of the processor U1 are coupled to the power terminal 5V_SYS. A reset pin of the processor U1 is coupled to the power terminal 5V_SYS through the switch SW1, and is grounded through the resistor R10. When the switch SW1 is closed, the processor U1 is reset. A ground pin GND of the processor U1 is grounded. A signal receive pin P0.5 of the processor U1 receives the processing signal of the processing module 30. A control signal pin P2.0 of the processor U1 is coupled to the optical disk drive 40, coupled to the power terminal 5V_SYS through the resistor R11, and grounded through the capacitor C2. A ground pin of the buzzer 102 is grounded, and a signal pin of the buzzer 102 is coupled to an audio output pin P2.7 of the processor U1 through the resistor R12. A detect pin P2.1 of the processor U1 is coupled to the control pin P2.0, to detect the status of the optical disk drive 40, such as a tray closed status or a tray open status. An audio output pin P3.1 of the processor U1 is coupled to the second input terminals of the XNOR gates U7-U10 of the sub-circuits 308, 306, 304, and 302, and to the XNOR gate U11 of the sub-circuit 300.

When the computer powers off, the power terminal 5V_SYS does not provide power, but the power terminal 5V_SB continues to provide power. At that time, the electronic switch Q1 is turned off, and the chip select pin CS of the A/D conversion chip U2 is at high level. The A/D conversion chip U2 stops operating.

When the computer is powered on, the power terminal 5V_SYS provides power, and the electronic switch Q1 is turned on. The chip select pin CS of the A/D conversion chip U2 is at low level, so that the A/D conversion chip U2 is operating. The processor U1 detects the status of the optical disk drive 40 through the detect pin P2.1. When the optical disk drive 40 is in the tray closed status, if the user says the word "open,", and the processor U1 outputs an operation signal representing "open" to the processing module 30 through the audio output pin P3.1 respective to the optical disk drive 40 being in the tray closed status. The A/D conversion chip U2 receives an analog signal corresponding to the spoken word "open," from the microphone 200 and converts the analog signal into a digital signal. The digital signal is transmitted to the processing module 30 through the output pin DOUT of the A/D conversion chip U2. The processing module 30 boosts and reduces the digital signal to the certain levels, for the predetermined number of times. When there is at least one sub-circuit in which the digital signal amplified by the amplifier is equal to the operation signal from the processor U1, the processing module 30 outputs a high level control signal to the signal receive pin P0.5 of the processor U1. The processor U1 controls the optical disk drive 40 to open, changing the status to the tray opened status, and controls the buzzer 102 to make a sound, in response to receiving the high level control signal.

When the optical disk drive 40 is in the tray closed status, if the user mistakenly speaks the word "close,", the processor U1 will still output the operation signal representing "open" in response to the optical disk drive 40 being in the tray closed status. Each sub-circuit will output a low level voltage comparison signal to the OR gate U12, for the digital signal amplified by the amplifier is not equal to the operation signal from the processor U1. Consequently, the processing module 30 will output a low level control signal to the processor U1 and the processor U1 will maintain the optical disk drive 40 in the original status, that is, in the tray closed status.

When the optical disk drive 40 is in the stray opened status, if the user speaks the word "close,", and the processor U1 outputs an operation signal representing "close" to the processing module 30 through the audio output pin P3.1 respective to the optical disk drive 40 being in the stray opened status. The A/D conversion chip U2 receives the analog signal corresponding to the spoken word "close," and converts the analog signal into the digital signal. The digital signal is transmitted to the processing module 30 through the output pin DOUT of the A/D conversion chip U2. The processing module 30 boosts and reduces the digital signal as before. When there is a digital signal, as amplified by the amplifier, in at least one-sub circuit which is equal to the operation signal from the processor U1, the processing module 30 outputs the high level control signal to the signal receive pin P0.5 of the processor U1. The processor U1 controls the optical disk drive 40 to close and change its status to the tray closed status, and controls the buzzer 102 to make a sound, in response to receiving the high level control signal.

When the optical drive 40 is in the tray open status, if the user mistakenly speaks the word "open," the processor U1 still outputs the operation signal representing "close" in response to the optical disk drive 40 being open. Each sub circuit outputs a low level voltage comparison signal to the OR gate U12, for the digital signal amplified by the amplifier is not equal to the operation signal from the processor U1. Consequently, the processing module 30 outputs the low level control signal to the processor U1. The processor U1 will maintain the optical disk drive 40 in the original tray open status.

While the disclosure has been described by way of example and in terms of a preferred embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A control circuit for an optical disk drive, comprising:
a microphone generating an analog signal corresponding to a voice;
an analog-to-digital (A/D) conversion module configured to convert the analog signal into a first digital signal;
a control module configured to output an operation signal according to a status of the optical disk drive; and
a processing module configured to boost or reduce the first digital signal for predetermined times, to generate a plurality of second digital signals, wherein the processing module is configured to receive the operation signal from the control module, and determine whether the operation signal is equal to one of the second digital signals, the processing module outputs a first processing signal responsive to the operation signal being equal to one of the second digital signals, and outputs a second processing signal responsive to the operation signal being not equal to any one of the second digital signals;
wherein when the control module receives the first processing signal, the control module controls the optical disk drive in a status different from a current status, and when the control module receives the second processing signal, the control module maintains the optical disk drive in an original status.

2. The control circuit of claim 1, wherein the A/D conversion module comprises an A/D conversion chip, the A/D conversion chip is configured to receive the analog signal through an input pin, and outputs the first digital signal through an output pin.

3. The control circuit of claim 2, wherein a clock signal pin of the A/D conversion chip is coupled to an output terminal of a NOR gate, a chip select pin of the A/D conversion chip is coupled to a first power terminal through a first resistor, a power pin of the A/D conversion chip is coupled to a second power terminal through a second resistor, a ground pin of the A/D conversion chip is grounded, a first input terminal of the NOR gate is coupled to a first crystal oscillator circuit, a second input terminal of the NOR gate is grounded through third and fourth resistors in that order, wherein the first crystal oscillator is configured to output a clock signal with a sine wave, the second input terminal of the NOR gate is configured to output a clock signal with a square wave.

4. The control circuit of claim 3, wherein the A/D conversion module further comprises an electronic switch, a first terminal of the electronic switch is coupled to the second power terminal, a second terminal of the electronic switch is coupled to the chip select pin of the A/D conversion chip, a third terminal of the electronic switch is grounded, when the first terminal of the electronic switch is at low level, the second terminal and the third terminal are disconnected from each other, and the A/D conversion chip stops operating, when the first terminal of the electronic switch is at high level, the second terminal and the third terminal are connected to each other, and the A/D conversion chip operates.

5. The control circuit of claim 4, wherein the electronic switch is an n-channel mental oxide semiconductor (NMOS), a gate, a drain, and a source of the NMOS are the first, second, and third terminals of the electronic switch, respectively.

6. The control circuit of claim 1, wherein the processing module comprises first to second sub-circuits, a fifth resistor and an OR gate, the first-sub circuit comprises a first XNOR gate, a first input terminal of the first XNOR gate is coupled to the A/D conversion module, to receive the first digital signal from the A/D conversion module, a second input terminal of the first XNOR gate is coupled to the processing module, to receive the operation signal from the processing module, an output terminal of the first XNOR gate is coupled to a first input terminal of the OR gate, a second sub-circuit comprises an amplifier and a second XNOR gate, an inverting terminal of the amplifier is configured to receive the first digital signal through the fifth resistor, and coupled to an output terminal of the amplifier through a sixth resistor, a non-inverting terminal of the amplifier is grounded, a ground terminal of the amplifier is grounded, a power terminal of the amplifier is coupled to a third power terminal, an output terminal of the amplifier is coupled to a first input terminal of the second XNOR gate, a second terminal of the second XNOR gate is configured to receive the operation signal, an output terminal of the second XNOR gate is coupled to a second input terminal of the OR gate, an output terminal of the OR gate is configured to output the first or second processing signal.

7. The control circuit of claim 6, wherein the control module comprises a processor, a signal receive pin of the processor is configured to receive the first or second processing signal, a detect pin of the processor is configured to detect the status of the optical drive, an audio output pin of the processor is configured to output the operation signal, and a control pin of the processor is configured to output a control signal to the optical disk drive.

8. The control circuit of claim 7, wherein the control circuit further comprises a buzzer, the audio output pin of the processor is coupled to the buzzer, when the processor outputs the control signal to the optical disk drive, the processor enables the buzzer to buzz.

9. The control circuit of claim 7, wherein the control circuit further comprises a second crystal oscillator circuit, the second crystal oscillator circuit comprises a crystal oscillator, a first capacitor, and a second capacitor, first and second terminals of the crystal oscillator are grounded, and coupled to first and second crystal pins of the processor respectively through the first and second capacitors.

10. The control circuit of claim 7, further comprising a switch, wherein a first end of the switch is coupled to the second power terminal, a second end of the switch is coupled to a reset pin of the processor, when the switch is closed, and the processor is reset.

* * * * *